Patented Dec. 12, 1933

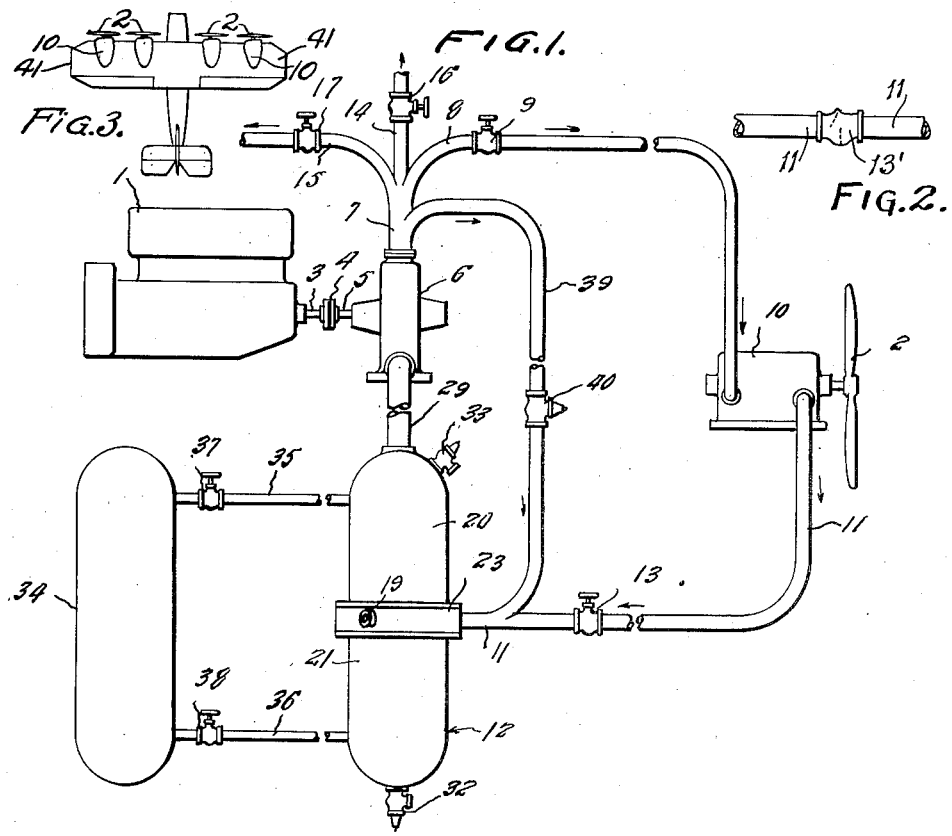

1,939,156

UNITED STATES PATENT OFFICE 1,939,156

PROPELLING MECHANISM

Leonard Kay Wright, Jackson Heights, N. Y., assignor of one-third to Harry H. Semmes, Raymond J. Norton, and S. Warwick Keegin, all of Washington, D. C., and one-third to Nicholas Di Marco, Corona, N. Y.

Application July 20, 1928, Serial No. 294,260
Renewed February 15, 1933

4 Claims. (Cl. 244—18)

My invention relates to aircraft and more particularly to mechanism for propelling aeroplanes, dirigibles and aircraft in general.

Heretofore, aircraft such as aeroplanes and dirigibles have been propelled through the air by means of propellers directly connected to the power shaft of an internal combustion engine. The power of an engine used for the propulsion of an aeroplane for instance, may be as high as 1200 horsepower. It is well known that engines having such power are usually very heavy and bulky.

In designing aeroplanes, it is necessary to place the engine in a position that will least disturb the equilibrium of the craft, under all flying conditions. It is desirable to have the engine as close to the propeller as possible to avoid the use of long power drives. Long shafts suitable for transmitting such power as is developed by some of the larger engines. would necessarily have to be heavily constructed. Also, long power transmitting shafts are dangerous, and are subject to vibration at high speeds. As a whole the use of long power transmitting shafts should be avoided, as the same does not correspond to the careful design necessary in aviation equipment.

The design of aeroplanes heretofore has been along lines permitting the use of an engine, directly connected with the propeller and located as near the front of the craft as possible, if of the type that is pulled by the propelling means or as near the rear of the craft as possible if the latter is to be forced through the air.

The distribution of weight is not entirely satisfactory when the engine or engines are placed at the nose of the plane or at other desirable locations for propellers, consequently, heretofore the plane has been more or less designed to cooperate with a particular propulsion mechanism. It is obvious that if the plane must be designed to cooperate with a particular propulsion means, that the range of flexibility of design is consequently rather narrow.

In some cases it has been found desirable to equip the plane with a plurality of propulsion units, distributed over the plane, to secure an even propulsion effect. Heretofore, when such design was resorted to, it was found that there were considerable losses due to the air resistance of the more or less bulky driving engines. Another disadvantage particularly in the multimotored planes is the lack of accessibility to the engines when flying. In many instances, minor repairs can be made to the engines without descending, if access can be had thereto. Any repairs that could be made without descending would result in a saving of time and fuel and would be highly desirable.

Disadvantages inherent in the propulsion mechanism for aeroplanes are also present in the propulsion mechanism used for dirigibles. The practice in dirigible design is to locate the engines in small streamline bodies suspended from the main supporting bag. It is obvious that access to the engines located in the small bodies is equally as difficult, if not more so than in the case of an aeroplane. Also, the combined bulk of the propelling engines offers quite a bit of wind resistance, and thus reduces the speed of the craft and its overall efficiency.

An object of my invention is to provide a propelling mechanism for aircraft that obviates many of the disadvantages of the propelling mechanism heretofore used.

Another object of my invention is to provide a propelling mechanism for aircraft in which power is transmitted from the engine to the propelling means through a fluid under pressure.

Another object of my invention is the utilization of one or a plurality of large engines or motors to drive a multiplicity of propellers.

Another object of my invention is to devise a novel system for transmitting power from a source to a point of utilization by means of a fluid under pressure.

Still another object of my invention is to so locate the main motor or motors that they will be available for easy inspection and operation and to allow easy cranking or starting of the same, thus making it unnecessary to utilize the present method of spinning or rocking the propeller to start the engine, which is highly dangerous.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

It is desirable in the design of aviation equipment to have the engines for supplying the power necessary for propulsion in a location in the aircraft where they will have the minimum effect on the equilibrium and stability of the aircraft under all possible operating conditions. My invention makes it possible to place the heavy engines for supplying the propulsive power in any location that best cooperates with the equilibrium and stability of the aircraft to which it is applied. Also, when the propelling mechanism constituting my invention is to be a part of the equipment of a particular aerial device, the engine or engines are located where they will be easily accessible, to facilitate the making of minor repairs without descending.

In carrying out my invention, as applied to aircraft, an internal combustion or other suitable engine of a capacity sufficient to supply all power necessary for the operation of the aircraft is installed in a part of the craft, where its weight will least affect the proper operation of the craft. The engine drives a suitable device for imposing pressure upon a power transmitting fluid, and is connected by conduits with fluid pressure operated motors in such a manner that the power transmitting fluid flows in a cycle through the pressure device, and the fluid pressure operated motors. The fluid pressure operated motors are connected to the propellers for driving the aircraft through the air.

These fluid pressure operated motors weigh considerably less than the engines for supplying the necessary power, and may be placed in any location where the propellers that they operate will be most effective for propelling the aircraft. Thus my invention permits the locating of the driving engine or engines in the most suitable place and the locating of the propellers where they will be most effective without the use of long power transmitting shafts or other more involved power transmitting mechanism.

This invention will be best understood from a consideration of the following description, taken in connection with the accompanying drawing, with the further understanding that while the drawing shows a practical form of the invention, the latter is not confined to any strict conformity with the showing of the drawing, but may be changed and modified so long as such changes and modifications come within the scope of the appended claims.

In the accompanying drawing:

Figure 1 is a diagrammatic representation of the different pieces of apparatus, showing the relation of the parts when operatively connected.

Figure 2 is a view showing a slight modification of a portion of the system illustrated in Figure 1.

Figure 3 is a view showing the fluid pressure motors associated with the wings of an airplane.

Referring to the drawing, Figure 1 shows a diagrammatical representation of a system for transmitting power from an internal combustion engine 1 to the propeller 2 for driving aircraft. The crankshaft 3 of the internal combustion engine 1, as shown in Figure 1, is connected through a flexible coupling 4 to a drive shaft 5 of a pump 6. The pump or compressor 6 may be of any type suitable for compressing or imposing a pressure upon a fluid either gaseous or liquid, and should be capable of maintaining a steady constant flow of fluid at the proper pressure. Pumps of either the piston type or the rotary type, the latter including the impeller or fixed blade turbine, gear, meshing, eccentric, or eccentric sliding piston types meet these requirements and may be used. It is desirable, particularly when used in connection with aircraft, that the pump be as light in weight as possible, of simple, sturdy design, of positive action, and constructed of few parts.

The discharge from the pump 6 is passed into a manifold 7 which communicates with a plurality of branch conduits 8, 14 and 15. As shown in Figure 1, the branch conduit 8, provided with a valve 9, places the manifold 7 in communication with a suitable fluid pressure operated motor 10. The fluid pressure operated motor 10 is adapted to operate a shaft carrying the propeller 2, for propelling the aircraft through the air. A return conduit 11 conducts the discharge from the fluid pressure operated motor 10, to a suitable reservoir 12. The conduit 11 is provided with a valve 13 so as to control the flow of fluid therethrough.

Other branch conduits 14 and 15 are provided with suitable valves 16 and 17 respectively. The conduits 14 and 15 are adapted to convey the power transmitting fluid under pressure, to fluid pressure operated motors similar to that indicated by reference numeral 10, and located at other points on the aircraft for propelling the same. The discharge from the last mentioned fluid pressure operated motors is conducted to the reservoir 12 through suitable conduits.

By means of the valves 9, 13, 16, 17, etc., each of the fluid pressure operated motors may be independently controlled. With this control arrangement, any one of the motors can be cut entirely out of the system and the others can be operated to their full capacity.

Valves such as 13 in the return lines may be of the check valve type such as is shown, by way of example, at 13' in Figure 2, in which case it would be necessary to shut off only the valve in the supply conduit to cut off one of the propelling motors; the check valve would operate to prevent the flow of fluid from the reservoir 12 to the propelling motor. Check valves used in this relation will also prevent loss of fluid in the event that a break should occur in the conduits connecting the motor with the reservoir 12.

The conduits for conducting the fluid under pressure and the fluid discharged from the fluid pressure operated motors may be made of any suitable tubing that is strong enough to withstand the pressures imposed thereon. In order to cut down losses due to the friction of the fluid flowing through the tubing, the latter should be seamless and have smooth interior walls. The tubing should be light in weight, since it is to be used for aircraft, and yet should have a high tensile strength in order to withstand the pressures to which the system will be subjected. It is particularly desirable that an alloy of the lighter metals be used; the alloys should, however, be of such composition that the constant vibration, to which the aircraft and the tubing is subjected, will not cause metal fatigue or crystallization of the alloy of which the tubes are constructed, with the consequent rupture thereof. Alloys containing steel, aluminum or copper serve very well for the purpose of withstanding the conditions to which the tubing just described will be subjected. In order to minimize the friction of the fluid flowing through the tubing, all the bends should be made with a long radius and the tubing connecting the different apparatus should be made as short as possible.

The fluid pressure operated motors may be of any design suitable for the purpose of operating a propeller, such as a simple expansion engine or turbine. These motors should be constructed as simply and as light as possible in order to minimize the weight that the air craft will have to carry.

As clearly shown in Figure 1, the reservoir 12 comprises an upper section 20 and a lower section 21 fastened by any suitable means to a central distributing member 23. The upper section 20 of the reservoir is provided with a valve 33 and the lower section 21 is provided with a valve 32. The function of the valves 32 and 33 will hereinafter appear. The joint between the member 23 and the sections 20 and 21 may be of any conventional fluid tight construction. The distributing member 23 is annular in shape and has its outer wall adapted to receive the conduits 11 and 19. This reservoir 12 is more fully described and claimed in my copending application, Serial No. 435,499, filed March 13, 1930.

Extending through the upper end of the reservoir 12, as shown in Figure 1, is a conduit 29 which communicates with pump 6 and serves to return fluid from reservoir 12 to said pump.

A safety feature that may be applied to my invention is constituted by an auxiliary reservoir 34 connected to reservoir 12 by suitable conduits 35 and 36 provided with valves 37 and 38 respectively. The reservoir 34 is connected by the conduits 35 and 36 with the reservoir 12 in such a manner that the auxiliary reservoir 34 will empty its contents into the reservoir 12 in any position in which the aircraft to which the system is applied may be, except in those positions in which the nose is pointed upward at a steep angle. This safety feature is especially desirable on very large aircraft where a large number of fluid pressure operated motors and propellers driven thereby would be used. With the application of my invention to aircraft employing a large number of the fluid pressure operated motors, there is a possibility of a joint breaking or in some way losing part or all of the fluid used for driving. By the use of the auxiliary fluid reservoir, the danger of loss of the driving fluid due to any break in the system is minimized, and the aircraft to which the system is applied is assured of a much greater degree of safety in regard to its power than if it were dependent on the use of the fluid pressure system alone.

If, in operation, a break should occur in any one particular system, that is, any set of conduits connecting a fluid pressure operated motor with the pump and the reservoir 12, a certain amount of the fluid would be lost before the valves admitting fluid to that particular section could be closed off. In order to make up the supply of fluid lost, the valves 37 and 38 could be so operated as to permit some of the fluid contained in the auxiliary reservoir 34 to flow into the reservoir 12, thereby providing an ample supply for proper operation.

Another feature of my system is in the provision of conduit 39 provided with a pressure relief valve 40. This conduit 39 operates to relieve the pressure imposed on the high pressure side of the pump 6 in order to prevent the rupture of any of the high pressure conduits, due to excess pressure thereon. Thus, if the pressure in the conduit 7 and likewise in any of the high pressure conduits reaches a point in excess of a predetermined pressure, the valve 40 will operate to allow a portion of the fluid to flow through conduit 39 into the pressure relief reservoir 12. Thus, it can be seen that excess pressure in any part of the system can be relieved without the loss of any of the power transmitting fluid. Of course, if the pressure in the whole system gets too high, the valve 32 will operate to relieve the excess pressure.

All of the pressure relief valves 32, 33 and 40 are so constructed that up to a predetermined pressure they will be leak proof, but when the predetermined pressure is reached, they will immediately open to relieve the excess pressure. After the excess pressure is relieved, they should again reseat to effectively seal the opening to prevent any leakage therethrough.

The power transmitting fluid may be either a gas or a liquid, but it is preferable to use a liquid. The liquid best suited for circulation in the system just described is a light oil. Any oil of light body, low viscosity, low congealing point and having lubricating properties is suitable for the purpose.

It is desirable to use a power transmitting fluid having lubricating properties as it dispenses with the necessity of oiling the equipment. This feature is particularly advantageous when high speed turbines are used for driving the propellers of the aircraft.

It is also possible to use other liquids as the power transmitting fluid, such as water, alcohol, glycerine. Also, other liquids that are preferably non-corrosive and have low freezing points are desirable as power transmitting medii. Water may be used as the power transmitting fluid, but if low temperatures are to be encountered, some substance such as a salt or other compound to lower the freezing point of the water must be dissolved therein.

In the operation of my invention as applied to aircraft, one or a plurality of fluid pressure operated motors or units carrying suitable propellers are located on the aircraft to be propelled in the places where they will be most effective. The driving engine, and connected fluid pressure generating pump, are placed in the part of the craft where they will least affect its operation. The main and auxiliary reservoirs are placed in any suitable and available space and connected by the valved conduits with the pressure generating pump and the pressure operated motors. The conduits are made as short as possible and located in place where they will be shielded from the weather and will not be in the way of the passengers in the aircraft.

When it is desired to operate the propellers, the engine 1 is started, which operates the pump 6, creating a flow of fluid. If one or more of the valves 9, 16 or 17 in the conduits 8, 14 or 15 are open, the motors carrying the propellers will be operated and the aircraft will tend to move.

If, however, the valves 9, 16 and 17 are closed, preventing the flow of fluid into the conduits leading to the motors, the valve 40 in by-pass 39 will open to relieve excessive pressure and permit the fluid to be circulated through the pump 6 and reservoir 12. When it is desired to move the aircraft, the propellers can be caused to rotate by merely opening one or more of the valves in the high pressure conduits leading to the driving units.

The fluid exhausted from the motors or units 10 is discharged into the reservoir 12 in which the pressure thereon is diminished, thus permitting any entrained or dissolved gases to be released.

Should it be found necessary to add more of the transmission fluid to the system, the same can be done by opening either or both of the valves 37 and 38 to allow the fluid in the receptacle 34 to flow into the reservoir 12.

Also, the adoption of these controllable motors in a plurality of small power units rather than a single large one, and the locating of one power unit on each side of the aeroplane fuselage, will stabilize and better propel the craft. It is understood, of course, that other propellers must be used on the nose and/or wings for propulsion, the fuselage units merely assisting the drive units and serving to stabilize the craft.

The use of many propellers instead of a single large one, located on the wings, fuselage, or even one at the tail, as in marine application of power, drives the aircraft in a much better manner. The air screws spread over a large surface, work in undisturbed air, and each screw is active. With one large screw doing all the work, the center portion of the screw works at a great loss in disturbed or agitated air. Also, a single screw has to pull along the inactive span of wings and fuselage. By the use of many screws, of small size, spread out along the wing span, the whole wing edge is pulled along, and the pull is distributed over the span, so that each unit is exerting a pull over a small area, giving greater total effective tractive effect. The small screws, besides being more effective than the large, are advantageous also in the event of propeller or unit trouble, in that the remaining power units will keep the craft on its course. By the use of valves or controls each and every unit is under immediate control and can be placed in service or cut out as desired.

In Figure 3 there is shown the fluid pressure motors 10 positioned along a main wing 41 of an airplane. The propellers 2 are shown directly connected to the fluid pressure operated motors 10. The fluid pressure system associated with the motors 10 is suitably positioned within the airplane structure. While I have shown the fluid pressure system as being associated with an airplane, it is to be clearly understood that it might also be associated with other forms of aircraft.

The application of my invention to aircraft eliminates the disadvantages heretofore encountered in the location of the propelling means and the engines for driving the same, and thus materially widens the range of flexibility of design of aircraft in general.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In combination with an airplane having wings, a fluid pressure generating unit, a plurality of fluid operated motors connected to said pressure generating unit and positioned along said wings, a propelling means connected directly to each of said motors to be operated thereby, a reservoir having a pressure relief valve therein adapted to receive exhaust from said pressure generating unit and an auxiliary reservoir adapted to feed fluid to said first-mentioned reservoir in the majority of positions of the airplane, the two reservoirs being valvularly connected together.

2. In combination with an airplane having wings, a fluid pressure generating unit, a plurality of fluid operated motors connected to said pressure generating unit and positioned along said wings, a propelling means connected directly to each of said motors to be operated thereby, a reservoir having a pressure relief valve therein adapted to receive exhaust from said pressure generating unit, an auxiliary reservoir adapted to feed fluid to said first-mentioned reservoir in the majority of positions of the airplane, the two reservoirs being valvularly connected together and means to relieve excess pressure within the system.

3. In a system for transmitting power to the propelling means of aircraft located on the wings thereof, utilizing a fluid under pressure as the transmission medium, a pressure generating unit, a pressure operated device, an automatically vented normally closed low pressure reservoir, a conduit connecting the generating unit and reservoir having a one-way valve, an auxiliary reservoir adapted to feed fluid to said first-mentioned reservoir in the majority of positions of the airplane, the two reservoirs being valvularly connected together and means to relieve excessive pressure within the system.

4. In combination with an aircraft, a fluid pressure generating unit, a plurality of fluid operated motors connected to said fluid pressure generating unit, a propelling means connected directly to each of said motors to be operated thereby, a reservoir having a pressure relief valve therein adapted to receive exhaust from said pressure generating unit and an auxiliary reservoir adapted to feed fluid to said first mentioned reservoir in the majority of positions of the aircraft, the two reservoirs being valvularly connected together.

LEONARD KAY WRIGHT.